(12) United States Patent

Hu

(10) Patent No.: US 12,572,361 B2

(45) Date of Patent: Mar. 10, 2026

(54) METHOD, APPARATUS, COMPUTER DEVICE, AND STORAGE MEDIUM FOR DETERMINING PAGE JUMP INFORMATION

(71) Applicant: Beijing Volcano Engine Technology Co., Ltd., Beijing (CN)

(72) Inventor: Po Hu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/982,124

(22) Filed: Dec. 16, 2024

(65) Prior Publication Data

US 2025/0199814 A1 Jun. 19, 2025

(30) Foreign Application Priority Data

Dec. 18, 2023 (CN) .......................... 202311745419.5

(51) Int. Cl.
*G06F 11/34* (2006.01)
*G06F 9/32* (2018.01)
*G06F 9/38* (2018.01)

(52) U.S. Cl.
CPC ............ *G06F 9/3806* (2013.01); *G06F 9/321* (2013.01); *G06F 11/3466* (2013.01)

(58) Field of Classification Search
CPC ..... G06F 9/3806; G06F 9/321; G06F 11/3466
See application file for complete search history.

(56) References Cited

U.S. PATENT DOCUMENTS

| | | | | |
|---|---|---|---|---|
| 6,061,715 A | * | 5/2000 | Hawes | ................ G06F 16/9574 709/217 |
| 2012/0036456 A1 | * | 2/2012 | Grunberger | ........... G06F 16/955 715/760 |

(Continued)

OTHER PUBLICATIONS

Vipul Kaushik et al., "React Native Application Development," 2018 [retrieved on Mar. 8, 2025], International Journal of Advanced Studies of Scientific Research, vol. 4, No. 1, pp. 461-467, downloaded from <url>:https://papers.ssrn.com/sol3/papers.cfm?abstract_id= 3330011. (Year: 2018).*

(Continued)

*Primary Examiner* — S. Sough
*Assistant Examiner* — Stephen D Berman
(74) *Attorney, Agent, or Firm* — Alleman Hall LLP

(57) ABSTRACT

The present disclosure relates to a field of computer technologies, and discloses a method, an apparatus, a computer device, and a storage medium for determining page jump information. The method includes: monitoring a page state of a page routing stack; in response to the page state changing, determining a current page and a previous page; detecting whether a page type of the current page is the same as a page type of the previous page; in response to the page type of the current page being different from the page type of the previous page, determining a first page type corresponding to the current page and a second page type corresponding to the previous page; determining page tracking information for the current page based on the first page type and the second page type; and determining page jump information corresponding to the current page based on the page tracking information.

17 Claims, 9 Drawing Sheets

(56)          References Cited

U.S. PATENT DOCUMENTS

| | | | | |
|---|---|---|---|---|
| 2013/0055078 A1* | 2/2013 | Berger | G06F 16/248 | |
| | | | 715/273 | |
| 2013/0144948 A1* | 6/2013 | Carriero | G06Q 10/101 | |
| | | | 709/204 | |
| 2018/0081693 A1* | 3/2018 | Burton | G06F 9/4401 | |
| 2018/0124109 A1* | 5/2018 | Hunt | G06V 30/40 | |
| 2018/0278671 A1* | 9/2018 | Zheng | G06F 16/957 | |
| 2019/0026383 A1* | 1/2019 | Ge | H04L 67/02 | |
| 2022/0365985 A1* | 11/2022 | Zhu | G06F 16/955 | |
| 2023/0276079 A1* | 8/2023 | Cai | H04N 21/2187 | |
| | | | 725/105 | |
| 2023/0362244 A1* | 11/2023 | Sun | H04L 67/1095 | |
| 2023/0385136 A1* | 11/2023 | Yang | G06F 9/451 | |
| 2025/0013705 A1* | 1/2025 | Zhang | G06F 16/9574 | |

OTHER PUBLICATIONS

Daniel Hedin et al., "JSFlow: tracking information flow in JavaScript and its APIs," Mar. 24, 2014 [retrieved Oct. 27, 2025], SAC '14: Proceedings of the 29th Annual ACM Symposium on Applied Computing, pp. 1663-1671, downloaded from <url>:https://dl.acm.org/doi/abs/10.1145/2554850.2554909. (Year: 2014).*

\* cited by examiner

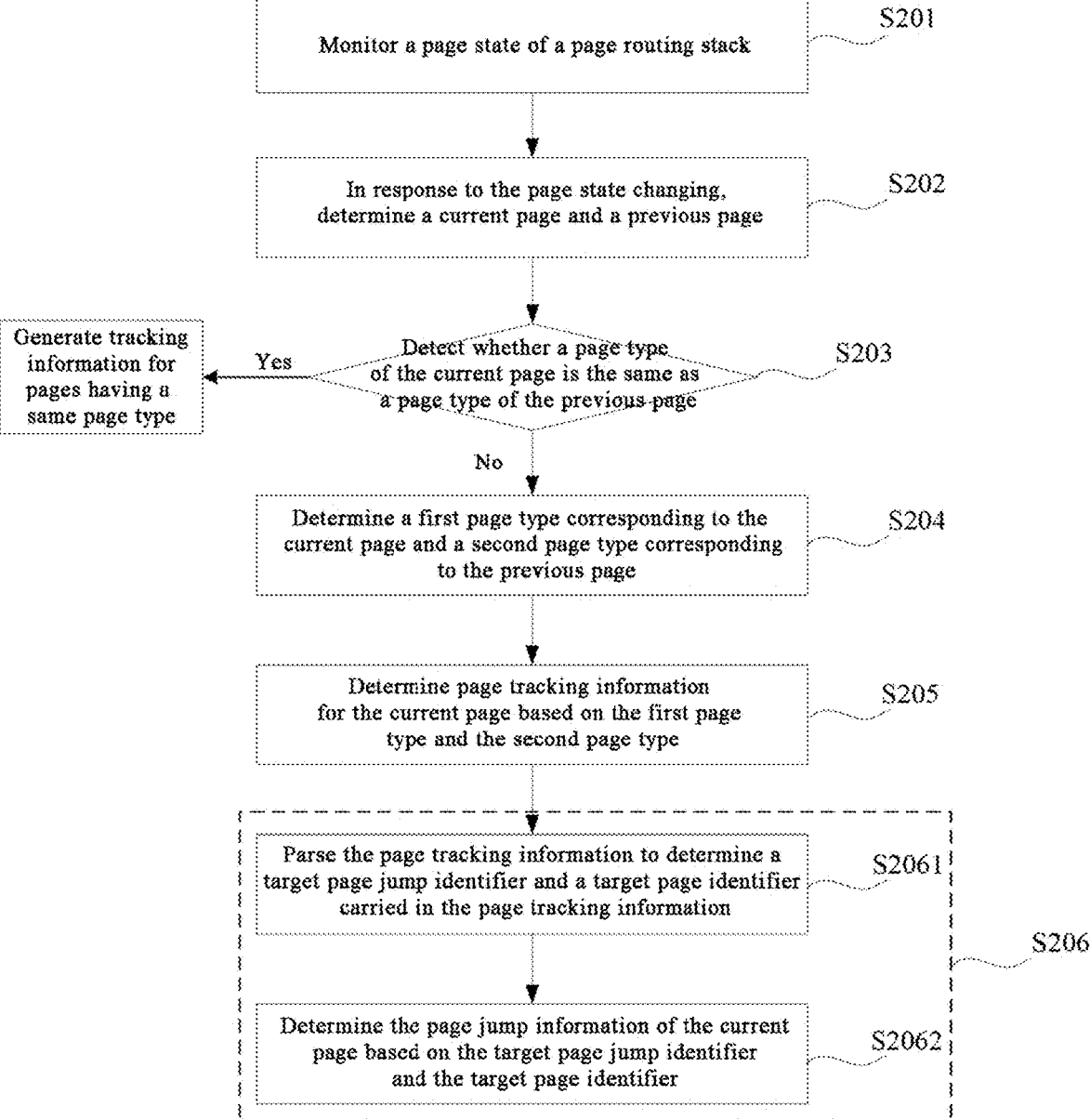

Monitor a page state of a page routing stack — S201

In response to the page state changing, determine a current page and a previous page — S202

Detect whether a page type of the current page is the same as a page type of the previous page — S203

Yes → Generate tracking information for pages having a same page type

No ↓

Determine a first page type corresponding to the current page and a second page type corresponding to the previous page — S204

Determine page tracking information for the current page based on the first page type and the second page type — S205

Parse the page tracking information to determine a target page jump identifier and a target page identifier carried in the page tracking information — S2061

Determine the page jump information of the current page based on the target page jump identifier and the target page identifier — S2062

| Monitoring Module | 401 |

| Page Change Monitoring Module | 402 |

| Page Type Detection Module | 403 |

| Page Type Determination Module | 404 |

| Tracking Information Generation Module | 405 |

| Jump Information Determination Module | 406 |

Processor — 10

Input Unit — 30

Memory — 20

Output Unit — 40

METHOD, APPARATUS, COMPUTER DEVICE, AND STORAGE MEDIUM FOR DETERMINING PAGE JUMP INFORMATION

CROSS-REFERENCE TO RELATED APPLICATION(S)

This application claims priority to Chinese Application No. 202311745419.5 filed in Dec. 18, 2023, the disclosure of which is incorporated herein by reference in its entirety.

FIELD

The present disclosure relates to the field of computer technologies, and in particular, to a method and apparatus for determining page jump information, a computer device, and a storage medium.

BACKGROUND

Currently, when different types of pages under a React Native framework jump to each other, each type of page only collects its own jump information. Therefore, redundant pageview trackings are often counted, resulting in an inflated number of pageview trackings, and it is difficult to correctly collect a jump relationship between different types of pages. Page jump information needs to be processed for a second time to restore a real jump situation of the page.

SUMMARY

In view of this, the present disclosure provides a method, an apparatus, a computer device, and a storage medium for determining page jump information, to solve a problem that it is difficult to correctly collect different types of page jump information.

According to a first aspect, the present disclosure provides a method for determining page jump information, including: monitoring a page state of a page routing stack, where the page routing stack is a stack data structure of an application used for managing page routing information; when the page state changes, determining a current page and a previous page; detecting whether a page type of the current page is the same as a page type of the previous page; when the page type of the current page is different from the page type of the previous page, determining a first page type corresponding to the current page and a second page type corresponding to the previous page; determining page tracking information for the current page based on the first page type and the second page type; and determining page jump information corresponding to the current page based on the page tracking information.

According to a second aspect, the present disclosure provides an apparatus for determining page jump information, including: a monitoring module configured to monitor a page state of a page routing stack, where the page routing stack is a stack data structure of an application used for managing page routing information; a page change monitoring module configured to determine a current page and a previous page when the page state changes; a page type detection module configured to detect whether a page type of the current page is the same as a page type of the previous page; a page type determination module configured to determine a first page type corresponding to the current page and a second page type corresponding to the previous page when the page type of the current page is different from the page type of the previous page; a tracking information generation module configured to determine page tracking information for the current page based on the first page type and the second page type; and a jump information determination module configured to determine page jump information corresponding to the current page based on the page tracking information.

According to a third aspect, the present disclosure provides a computer device, including: a memory and a processor, where the memory and the processor are in communication connection with each other, computer instructions are stored in the memory, and the processor executes the computer instructions to perform the method for determining page jump information according to the first aspect or any of the corresponding implementations of the first aspect.

According to a fourth aspect, the present disclosure provides a computer-readable storage medium having stored thereon computer instructions that are configured to cause a computer to perform the method for determining page jump information according to the first aspect or any of the corresponding implementations of the first aspect.

BRIEF DESCRIPTION OF THE DRAWINGS

In order to more clearly describe the specific embodiments of the present disclosure or the technical solutions in the prior art, the accompanying drawings for describing the specific embodiments or the prior art will be briefly described below. Apparently, the accompanying drawings in the following description show some embodiments of the present disclosure, and a person of ordinary skill in the art may still derive other drawings from these drawings without creative efforts.

FIG. 14 is a schematic flowchart of still another method for determining page jump information according to an embodiment of the present disclosure;

DETAILED DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

When different types of pages under a React Native framework jump to each other, each type of page only collects its own jump information. It is difficult to correctly collect a jump relationship between different types of pages. Page jump information needs to be processed for a second time to restore a real jump situation of the page.

Based on this, when it is monitored that a page state changes, the technical solution of the present disclosure can accurately determine a current page and a previous page based on the change of the page state, generate a page identifier from the current page, and generate a page jump identifier from the previous page, to generate page tracking information based on the page identifier and the page jump identifier. In this way, the page jump identifier field in the page tracking information is used to record a previously accessed page, to track a browsing path of the page, thereby implementing accurate collection of page jump information and accurate generation of page tracking information.

According to an embodiment of the present disclosure, an embodiment of a method for determining page jump information is provided. It should be noted that the steps shown in the flowcharts of the accompanying drawings may be performed in a computer system, such as a set of computer-executable instructions. Although a logical order is shown in the flowcharts, in some cases, the steps shown or described may be performed in an order different from the order in the flowcharts.

Figure 1:
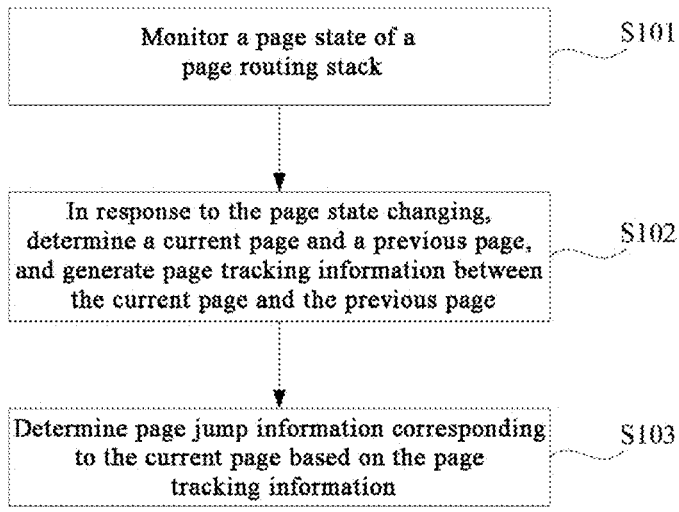
FIG. 1 is a schematic flowchart of a method for determining page jump information according to an embodiment of the present disclosure.

In this embodiment, a method for determining page jump information is provided, which may be applied to a computer device, such as a mobile phone, a tablet computer, a computer, or the like. FIG. 1 is a flowchart of the method for determining page jump information according to an embodiment of the present disclosure. As shown in FIG. 1, the process includes the following steps.

Step S101: Monitor a page state of a page routing stack.

The page routing stack is a stack data structure of an application used for managing page routing information.

Under a React Native framework, page routing information is managed through the page routing stack, which can track a page that is opened and a page that is closed in an application, and manage the pages based on an order in which the pages are opened and closed.

For example, the page routing stack may manage the page routing information using a last-in first-out principle. Specifically, when a switch is made from one page to another new page, the new page is pushed to the top of the page routing stack. When a return is made from a current page to a previous page, the current page is popped from the page routing stack, and the previous page is displayed.

The page state is used to represent a switching state between pages, and the page state may be represented by an open state and a closed state of the page. An application is deployed on a computer device, and a user can browse each page in the application. The page routing stack can record each page browsed by the user in the application, so that the page state of each page can be monitored through the page routing stack, to determine whether the page state changes, for example, whether the page state is switched from the open state to the closed state. When the page state changes, step S102 is performed; otherwise, it indicates that the page state does not change, and generation of tracking information is not triggered.

Step S102: When the page state changes, determine a current page and a previous page, and generate page tracking information between the current page and the previous page.

The current page is a currently opened page of the application, that is, a page currently accessed by the user; and the previous page is a page previously opened by the application before the current page is opened, that is, a previous page accessed by the user. When the page state changes, a browsing path of the page can be determined based on the page state, and the current page and the previous page of the application can be determined based on the browsing path of the page.

The page tracking information is used to represent page access information in the application, such as a page access path and a page behavior. Specifically, the page tracking information may include a pageview tracking and a pageleave tracking. For example, when a switch is made from a home page to a detail page, the current page is the detail page, and the home page is the previous page. In this case, the pageview tracking can be triggered for the detail page, and the pageleave tracking can be triggered for the home page.

Step S103: Determine page jump information corresponding to the current page based on the page tracking information.

The page jump information is used to record previous page information, to generate a page jump path. The browsing path of the user for each page can be determined based on the page tracking information. In this way, page identifier information can be generated based on the current page, and the page jump information is generated based on the previous page corresponding to the current page.

For example, when a switch is made from a home page (Homepage) to a detail page (Detailpage), the current page is the detail page, and the home page is the previous page. In this case, the pageview tracking can be triggered for the detail page, and the pageleave tracking can be triggered for the home page. In this case, the page jump information generated during the pageview tracking for the detail page is the home page, that is, referPage: Homepage.

According to the method for determining page jump information provided in this embodiment, when it is monitored that the page state changes, the current page and the previous page can be accurately determined based on the change of the page state, and the page type of the current page and the page type of the previous page can be detected, to generate the page tracking information based on different page types. This method is not limited to the same page type. Therefore, when the page state changes, switching between different types of pages can be accurately collected to generate accurate page tracking information, thereby avoiding triggering of redundant tracking and ensuring accurate generation of the page tracking information, so that the page jump information can be accurately counted through the page tracking information.

Figure 2:
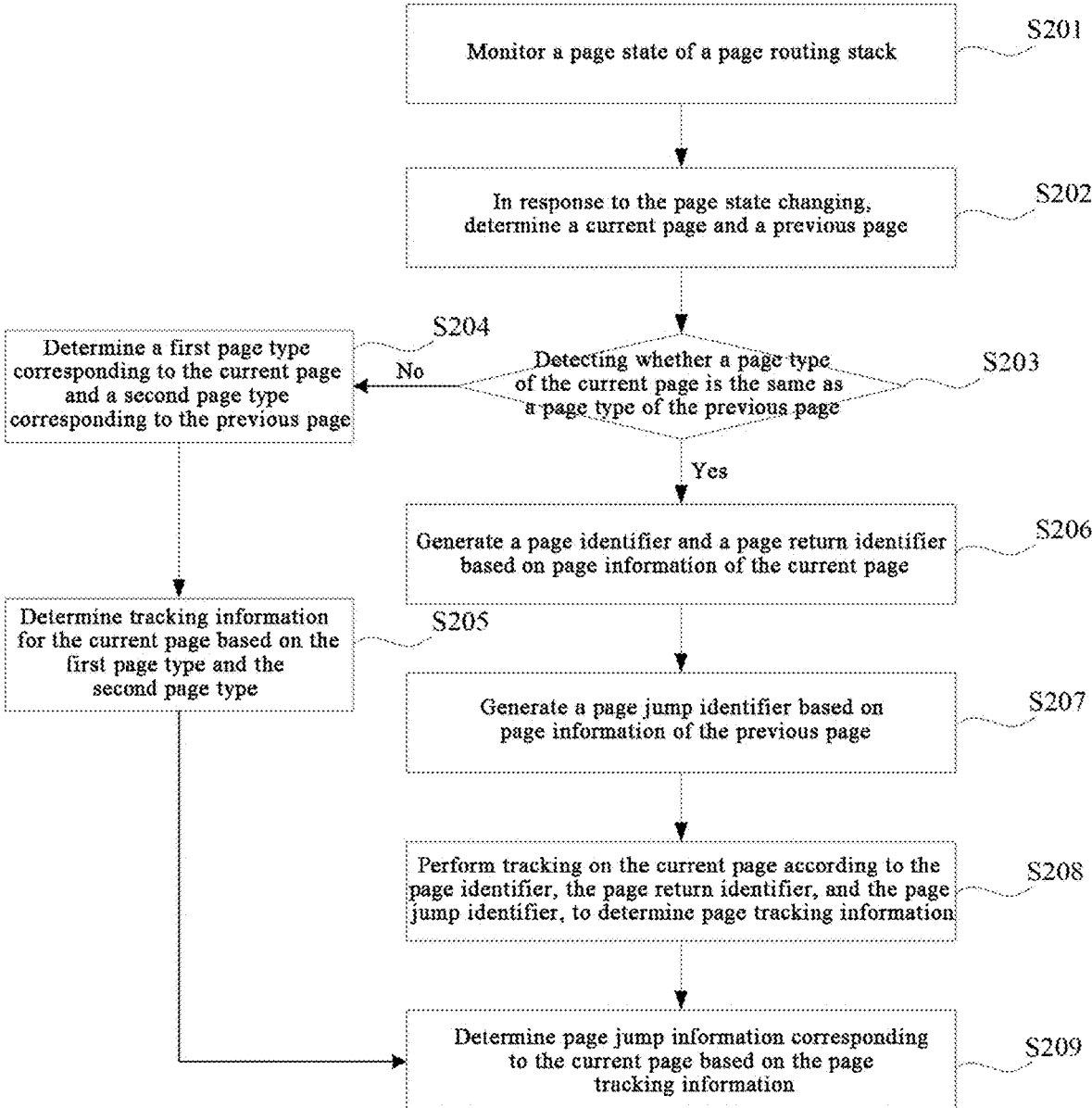
FIG. 2 is a schematic flowchart of another method for determining page jump information according to an embodiment of the present disclosure.

In this embodiment, a method for determining page jump information is provided, which may be applied to a computer device, such as a mobile phone, a tablet computer, a computer, or the like. FIG. 2 is a flowchart of the method for determining page jump information according to an embodiment of the present disclosure. As shown in FIG. 2, the process includes the following steps.

Step S201: Monitor a page state of a page routing stack, where the page routing stack is a stack data structure of an application used for managing page routing information. For details, refer to the related description of the corresponding step in the method embodiment described above, which is not described herein again.

Step S202: When the page state changes, determine a current page and a previous page. For details, refer to the related description of the corresponding step in the method embodiment described above, which is not described herein again.

Step S203: Detect whether a page type of the current page is the same as a page type of the previous page.

Figure 3:
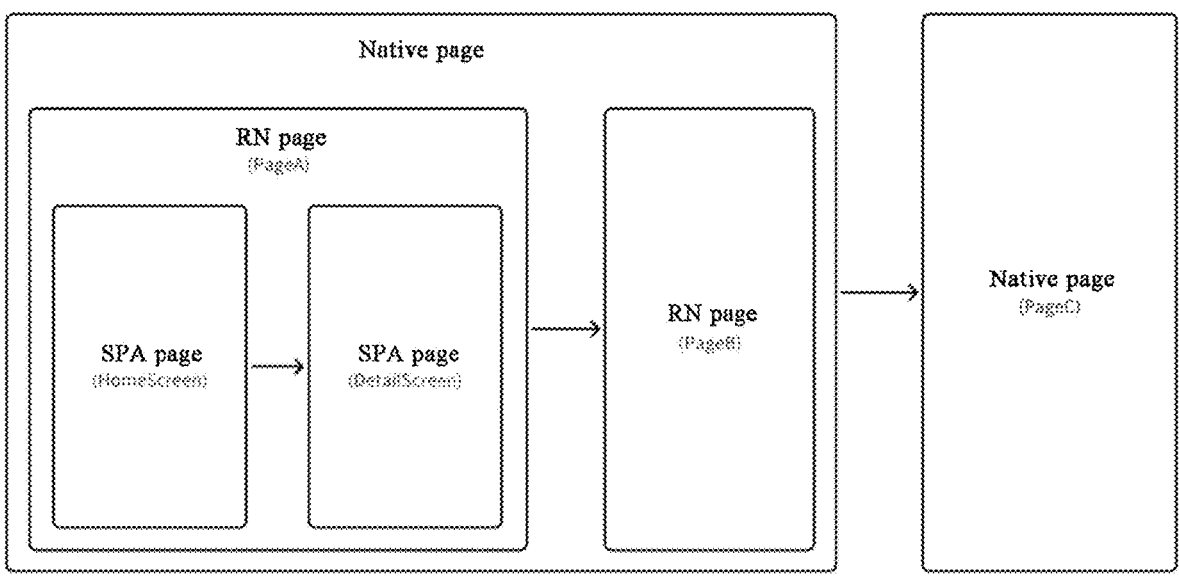
FIG. 3 is a schematic diagram of different types of pages according to an embodiment of the present disclosure.

The page type is used to represent a type of a page displayed in a view. Specifically, the page type includes a native page (Native page), a native interactive page (React Native page, RN page), and an application page (SPA page). A relationship between the page types is shown in FIG. 3. The RN page and the SPA page are pages defined based on a React Native framework. Each RN page has a mapping from a React component in JavaScript to a ReactRootView component in Native, and a page type identifier is appKey, and an identifier of a page instance is rootTag. One RN page has a plurality of different SPA pages, and the SPA page is essentially a React Navigation page, and each page is a Screen component.

When the page state changes, it indicates that the page is switched. In this case, it can be detected whether the page type of the current page is the same as the page type of the previous page. If the page type of the current page is the same as the page type of the previous page, step S204 is performed; otherwise, step S206 is performed.

Step S204: When the page type of the current page is different from the page type of the previous page, determine a first page type corresponding to the current page and a second page type corresponding to the previous page.

Different types of pages correspond to different page information. The first page type is used to represent a type of the current page, and the second page type is used to represent a type of the previous page. After it is determined that the page type of the current page is different from the page type of the previous page, the first page type corresponding to the current page can be determined by parsing page information of the current page, and the second page type corresponding to the previous page can be determined by parsing page information of the previous page.

For example, the first page type corresponding to the current page is an RN page, and the second page type corresponding to the previous page is a Native page; or the first page type corresponding to the current page is a SPA page, and the second page type corresponding to the previous page is an RN page.

Step S205: Determine page tracking information for the current page based on the first page type and the second page type.

When a jump is made from the previous page to the current page, a page type jump manner from the previous page to the current page can be determined based on the first page type and the second page type. Different page type jump manners have corresponding page tracking strategies. Therefore, when a page jump occurs, the page tracking strategy corresponding to the page jump can be determined based on the first page type and the second page type, so that tracking for the current page can be triggered according to the page tracking strategy, to generate corresponding page tracking information.

In some optional implementations, when the current page is an application page and the previous page is another page, step S205 may include the following steps.

Step a1: Obtain a first native interactive page to which the application page belongs.

Step a2: Generate a first page identifier and a first page jump identifier for the first native interactive page based on page information of the first native interactive page and page information of the other page.

Step a3: Generate a second page identifier, a second page jump identifier, and a first page return identifier for the application page based on page information of the application page and page information of the first native interactive page.

Step a4: Merge the first page identifier and the second page jump identifier, determine the first page jump identifier as a first target jump identifier of the application page, and determine the second page identifier as a first target page identifier of the application page.

Step a5: Perform tracking on the application page according to the first target jump identifier, the first target page return identifier, and the first target page identifier, to generate page tracking information of the application page.

The first native interactive page is an RN page generated based on a React Native framework, the application page is a SPA page included in the RN page, and the other page is a page different from the SPA page.

The first page identifier is a unique identifier of the RN page; and the first page jump identifier is a unique identifier of a previous page that jumps to the first native interactive page.

Because the application page is included in the RN page, when it is detected that the application page is entered from the other page, the computer device may determine, by parsing the page information, the RN page to which the application page belongs. The first page identifier of the first native interactive page can be determined by parsing the page information of the first native interactive page, and the first page jump identifier for the first native interactive page can be determined by parsing the page information of the other page.

Figure 4:
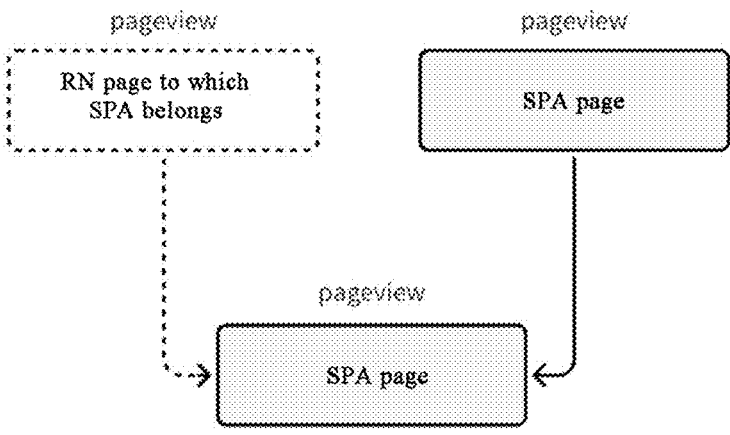
FIG. 4 is a schematic diagram of tracking merging of SPA pages according to an embodiment of the present disclosure.

As shown in FIG. 4, when a SPA page HomeScreen is entered from another page PageB, because an RN page to which the SPA page HomeScreen belongs is PageA (that is, the first native interactive page), a first page identifier pageKey: PageA and a first page jump identifier referPage: PageB can be determined for PageA.

The second page identifier is a unique identifier of the application page. The second page jump identifier is a unique identifier of a previous page that jumps to the application page. The first page return identifier is used to represent whether the application page is a return page.

When a jump is made from the other page to the application page, both the application page and the first native interactive page to which the application page belongs will generate a pageview tracking. Therefore, the tracking information needs to be merged and finally merged into tracking information of the application page, as shown in FIG. 4.

Specifically, the first page jump identifier and the second page jump identifier are merged and connected, the first page jump identifier is used as a first target jump identifier of the application page, and the second page identifier is used as a first target page identifier of the application page.

Figure 5:
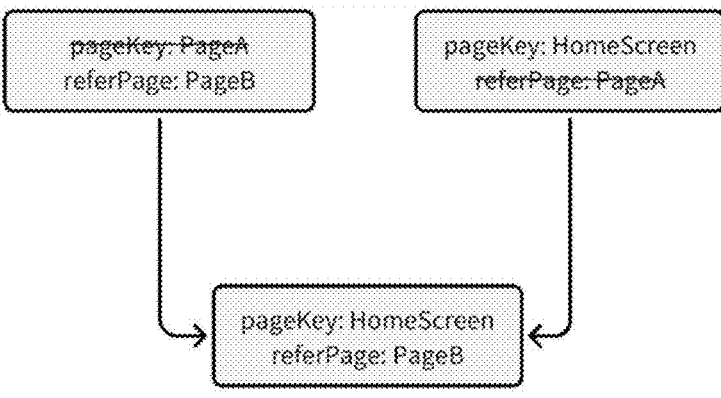
FIG. 5 is a specific schematic diagram of tracking merging of SPA pages according to an embodiment of the present disclosure.

As shown in FIG. 5, when the SPA page HomeScreen in the PageA page is entered from the other page PageB, based on page information of the SPA page HomeScreen and page information of the PageA page, a second page identifier pageKey: HomeScreen, a second page jump identifier referPage: PageA, and a first page return identifier isback: false can be determined for the SPA page HomeScreen.

The first page identifier pageKey: PageA and the second page jump identifier referPage: PageA are merged to obtain a first target page identifier pageKey: HomeScreen and a first target jump identifier referPage: PageB, for the SPA page HomeScreen.

Figure 6:
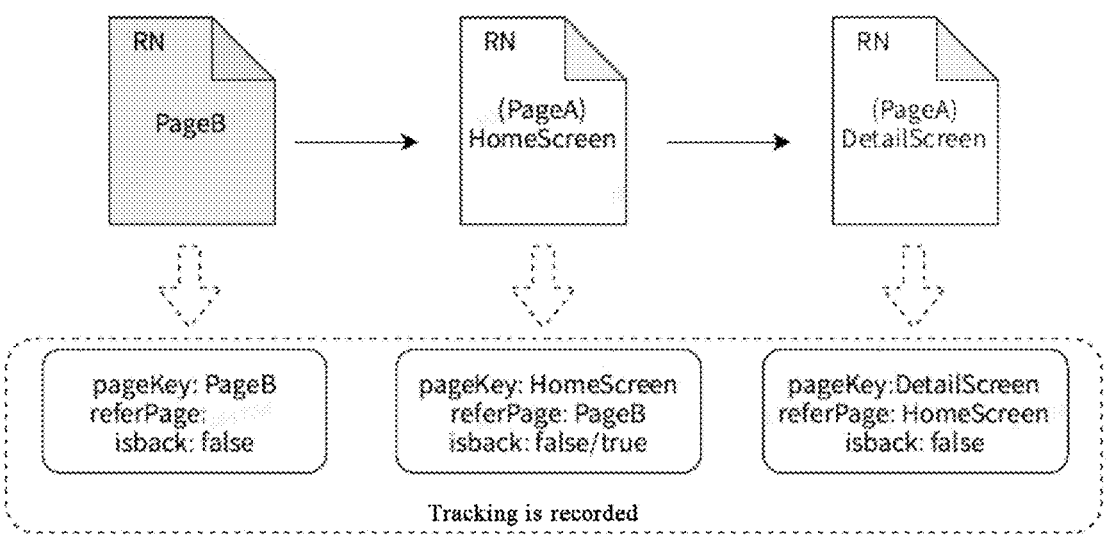
FIG. 6 is a schematic diagram of jumps of SPA pages according to an embodiment of the present disclosure.

Tracking for the application page is triggered based on the first target jump identifier, the first target page return identifier, and the first target page identifier corresponding to the application page, to generate page tracking information for the application page. As shown in FIG. 6, when the SPA page HomeScreen in the PageA page is entered from the other page PageB, page tracking information corresponding to the SPA page HomeScreen is generated based on the recorded first target page identifier pageKey: HomeScreen, the first target jump identifier referPage: PageB, and the first page return identifier isback: false.

In the foregoing implementation, when the current page is the application page and the previous page is the other page, the native interactive page to which the application page belongs is detected, so that the page jump identifier generated when a jump is made from the other page to the application page can be accurately determined, thereby implementing tracking merging and tracking connection from the other page to the application page, avoiding triggering of redundant tracking, and improving accuracy of the page tracking information.

In some optional implementations, when the current page is another page and the previous page is an application page, step S205 may include the following steps.

Step b1: Obtain a second native interactive page to which the application page belongs.

Step b2: Generate a third page identifier, a third page jump identifier, and a second target page return identifier for the other page based on page information of the other page and page information of the second native interactive page.

Step b3: Generate a fourth page identifier and a fourth page jump identifier for the application page based on page information of the application page and page information of the second native interactive page.

Step b4: Merge the third page jump identifier and the fourth page jump identifier, determine the fourth page identifier as a second target jump identifier of the other page, and determine the third page identifier as a second target page identifier of the other page.

Step b5: Perform tracking on the other page according to the second target jump identifier, the second target page return identifier, and the second target page identifier to generate page tracking information of the other page.

The second native interactive page is an RN page generated based on a React Native framework, the application page is a SPA page included in the RN page, and the other page is a page different from the SPA page.

The third page identifier is a unique identifier of the other page. The third page jump identifier is a unique identifier of an application page that jumps to the other page. The second target page return identifier is used to represent whether the current other page is a return page.

Because the SPA page is included in the RN page, when it is detected that the other page is entered from the application page, the computer device may determine, by parsing the page information of the application page, the RN page (that is, the second native interactive page) to which the application page belongs. In addition, the third page identifier, the third page jump identifier, and the second target page return identifier for the other page can be determined by parsing the page information of the other page.

Figure 7:
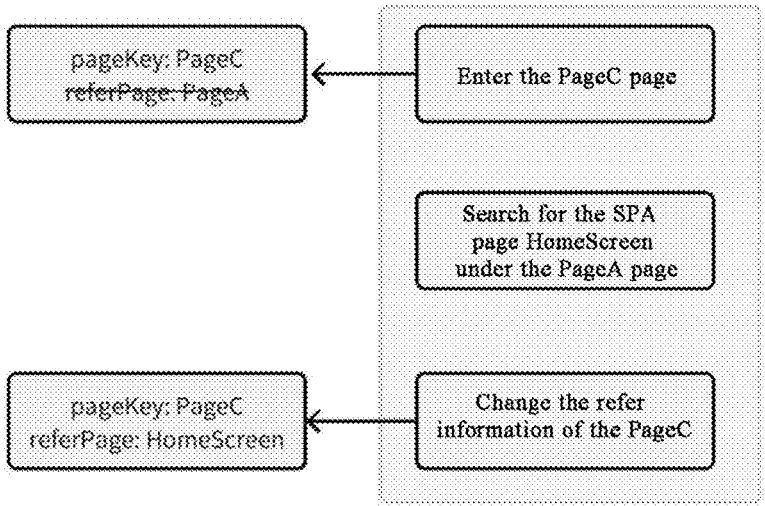
FIG. 7 is another schematic diagram of tracking merging of SPA pages according to an embodiment of the present disclosure.

As shown in FIG. 7, when the other page PageC is entered from the SPA page HomeScreen, it can be determined that an RN page (for example, an RN page PageA) to which the PageA page belongs. Based on page information of the RN page to which the SPA page HomeScreen belongs and page information of the PageC page, a third page identifier pageKey: PageC, a third page jump identifier referPage: PageA, and a second page return identifier isback: false can be determined for the PageC.

The fourth page identifier is a unique identifier of the application page; and the fourth page jump identifier is a unique identifier of a previous page that jumps to the application page.

As shown in FIG. 7, when the other page PageC is entered from the SPA page HomeScreen in the PageA page, because the RN page to which the SPA page belongs is PageA, the SPA page HomeScreen under the PageA page can be found. Therefore, a fourth page identifier pageKey: HomeScreen and a fourth page jump identifier referPage: PageA can be determined for the SPA page.

Figure 8:
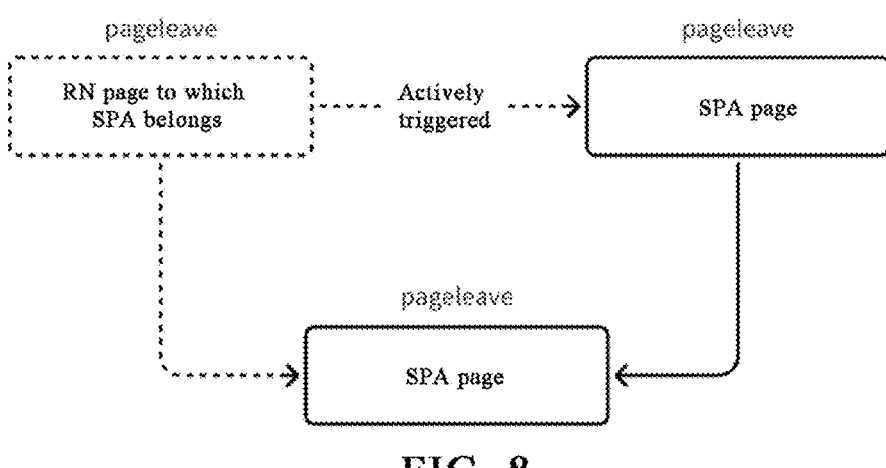
FIG. 8 is a specific schematic diagram of another tracking merging of SPA page jumps according to an embodiment of the present disclosure.

When a jump is made from the application page to the current other page, each of the application page and the second native interactive page to which the application page belongs will generate a pageleave tracking. Therefore, the tracking information needs to be merged and finally merged into tracking information of the SPA page, as shown in FIG. 8.

Specifically, because the application page belongs to the second native interactive page, when a jump is made from the application page to the other page, the pageleave tracking for the second native interactive page is first triggered, and then the pageleave tracking for the SPA page is triggered by the second native interactive page. Therefore, the third page jump identifier and the fourth page jump identifier can be merged, the fourth page identifier is used as a second target jump identifier corresponding to the other page, and the third page identifier is used as a second target page identifier corresponding to the other page.

As shown in FIG. 7, the third page jump identifier referPage: PageA and the fourth page jump identifier referPage: PageA are merged, to obtain a second target page identifier pageKey: PageC and a second target jump identifier referPage: HomeScreen, for the PageC.

Figure 9:
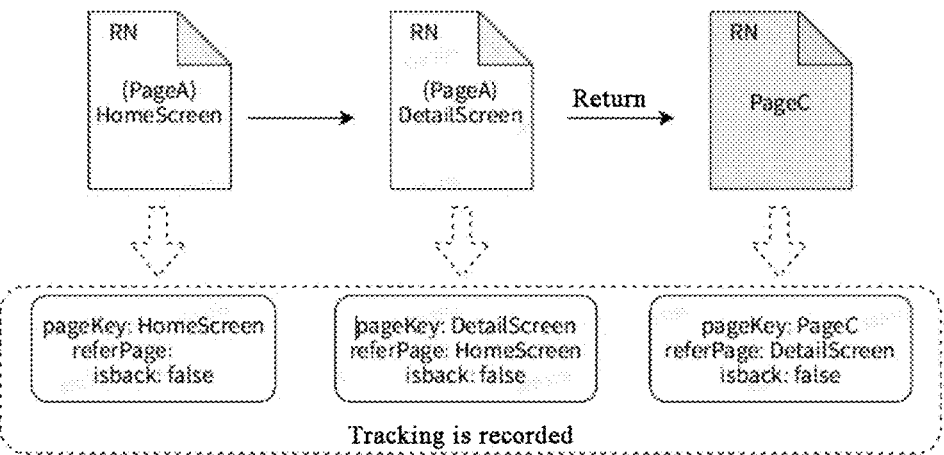
FIG. 9 is a schematic diagram of jumps between SPA pages and RN pages according to an embodiment of the present disclosure.

Tracking for the current other page is triggered based on the second target jump identifier, the second target page return identifier, and the second target page identifier corresponding to the current other page, to generate page tracking information for the current other page. As shown in FIG. 9, when a return is made from the SPA page DetailScreen in the PageA page to the other page PageC, page tracking information corresponding to the PageC is generated based on the recorded second target page identifier pageKey: PageC, the second target jump identifier referPage: DetailScreen, and the second page return identifier isback: true.

In the foregoing implementation, when the current page is the other page and the previous page is the application page, the native interactive page to which the application page belongs is detected, so that the page jump identifier generated when a jump is made from the application page to the other page can be accurately determined, thereby implementing tracking merging and tracking connection from the application page to the other page, avoiding triggering of redundant tracking, and improving accuracy of the page tracking information.

In some optional implementations, when the current page is a native page and the previous page is a native interactive page, step S205 may include the following steps.

Step c1: Determine page tracking information corresponding to the native interactive page based on page information of the native interactive page.

Step c2: When entering the native page from the native interactive page, stop generating page tracking information for the current page.

When entering the native interactive page, the page information of the native interactive page can be parsed to generate page tracking information corresponding to the native interactive page. Because the native page generates page tracking information for the current page, when entering the native page from the native interactive page, the page tracking information for the current page is no longer generated.

Figure 10:
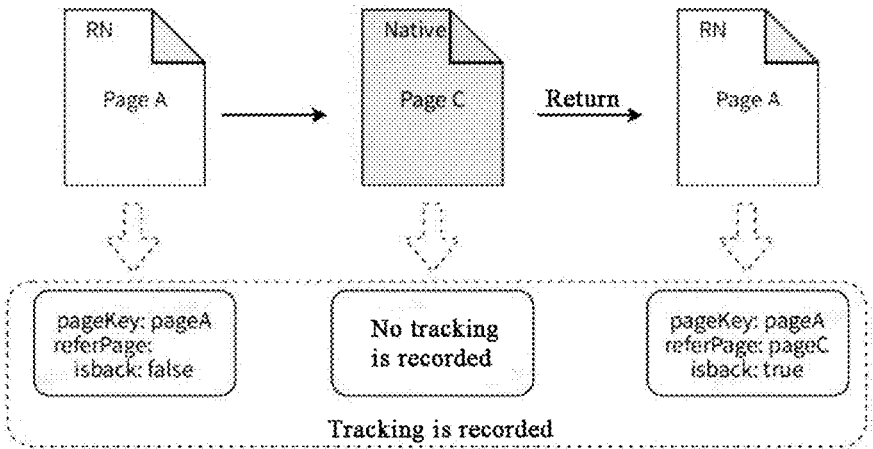
FIG. 10 is a schematic diagram of jumps between RN pages and native pages according to an embodiment of the present disclosure.

As shown in FIG. 10, when entering the RN page PageA, page tracking information for the PageA can be generated, which specifically includes: a page identifier pageKey: pageA, a page jump identifier referPage: and a page return identifier isback: false. When entering the native page PageC from the RN page PageA, page tracking information for the PageC is not recorded.

In the foregoing implementation, when entering the native page from the native interactive page, the page tracking information is no longer generated for the native page, thereby implementing tracking connection between the native interactive page and the native page and avoiding generation of redundant page tracking.

In some optional implementations, when the current page is a native interactive page and the previous page is a native page, step S205 may include the following steps.

Step d1: Generate a current page identifier and a current page return identifier based on page information of the native interactive page.

Step d2: Generate a current page jump identifier based on page information of the native page.

Step d3: Perform tracking on the native interactive page according to the current page identifier, the current page return identifier, and the current page jump identifier to generate page tracking information of the native interactive page.

The current page identifier is a unique identifier of the currently entered native interactive page. The current page return identifier is used to represent whether the currently entered native interactive page is a return page. When entering the native interactive page from the native page, the computer device may parse the page information of the currently entered native interactive page, to determine the current page identifier and the current page return identifier corresponding to the native interactive page.

The current page jump identifier is used to represent a unique identifier of a previous native page before entering the native interactive page. When it is detected that the native interactive page is entered from the native page, the computer device may parse the page information of the native page, to determine the current page jump identifier corresponding to the native interactive page.

Tracking for the native interactive page is triggered based on the current page identifier, the current page return identifier, and the current page jump identifier corresponding to the native interactive page, to generate page tracking information for the native interactive page.

As shown in FIG. 10, when a return is made from the native page PageC to the RN page PageA, a current page identifier pageKey: pageA, a current page return identifier isback: true, and a current page jump identifier referPage: pageC corresponding to the RN page PageA can be determined. Tracking information is generated based on the current page identifier pageKey: pageA, the current page return identifier isback: true, and the current page jump identifier referPage: pageC corresponding to the RN page PageA, to obtain page tracking information for the RN page PageA.

In the foregoing implementation, when entering the native interactive page from the native page, the page information of the native page is used to generate the current page jump identifier, thereby ensuring accurate collection of page jump information from the native page to the native interactive page.

Step S206: When the page type of the current page is the same as the page type of the previous page, generate a page identifier and a page return identifier based on page information of the current page.

The page identifier is used to represent an identifier of the current page, and the current displayed page is uniquely represented by the page identifier. The page return identifier is used to represent whether the current page is a return page. The page routing stack can generate tracking information based on the page information of the current page, to determine the page identifier and the page return identifier.

Figure 11:
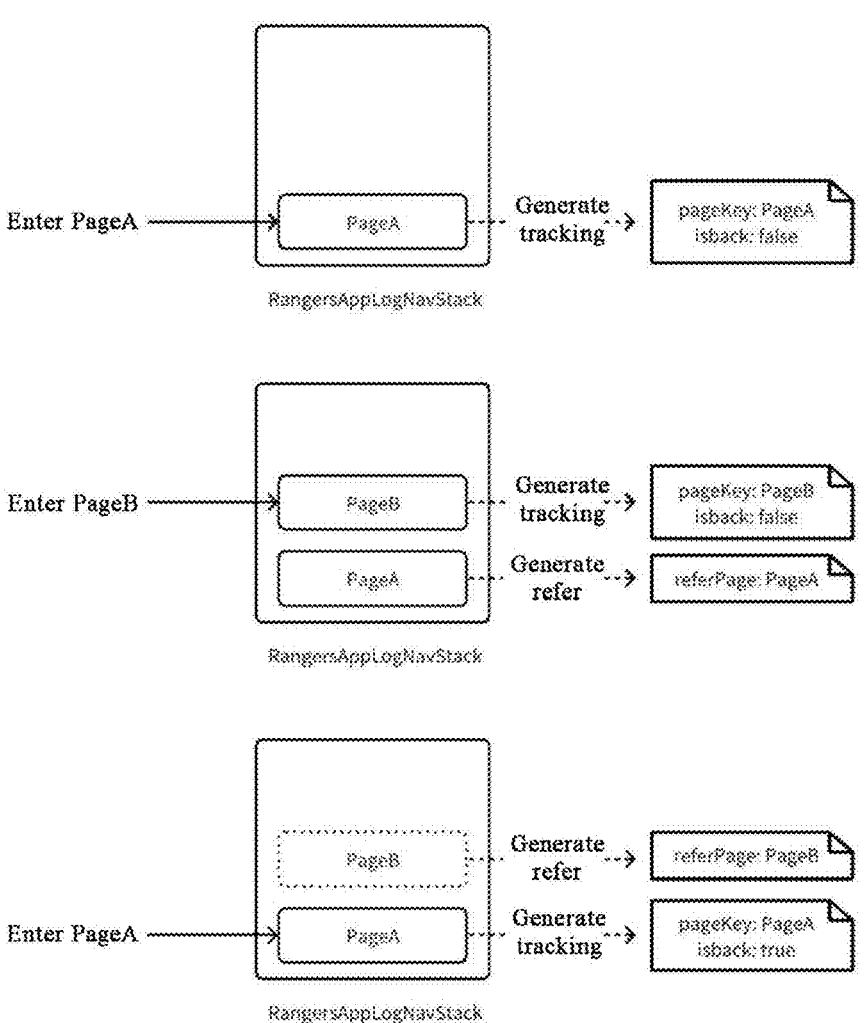
FIG. 11 is a schematic diagram of jumps of RN pages according to an embodiment of the present disclosure.

As shown in FIG. 11, taking jumps between RN pages PageA→PageB→PageA as an example, when entering the PageA for the first time, the page routing stack may read page information of the PageA to generate a page identifier pageKey: PageA and a page return identifier isback: false, for the PageA. When entering the PageB from the PageA, the page routing stack may record a switching state of the page, to generate a page identifier pageKey: PageB and a page return identifier isback: false, for the PageB. When a return is made from the PageB to the PageA, the page routing stack may generate a page identifier pageKey: PageA and a page return identifier isback: true, for the PageA, based on the switching state of the page.

Figure 12:
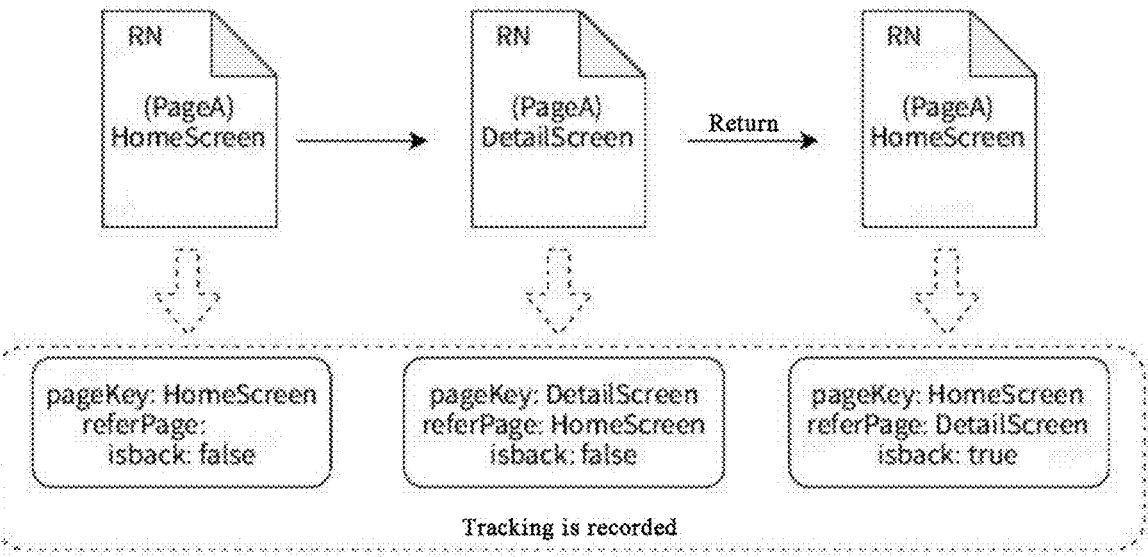
FIG. 12 is a schematic diagram of jumps of SPA pages according to an embodiment of the present disclosure.

As shown in FIG. 12, taking jumps between SPA pages HomeScreen→DetailScreen→HomeScreen in the PageA page as an example, when entering the HomeScreen for the first time, the page routing stack may read page information of the HomeScreen to generate a page identifier pageKey: HomeScreen and a page return identifier isback: false, for the HomeScreen. When entering the DetailScreen from the HomeScreen, the page routing stack may record a switching state of the page, to generate a page identifier pageKey: DetailScreen and a page return identifier isback: false, for the DetailScreen. When a return is made from the DetailScreen to the HomeScreen, the page routing stack may record a switching state of the page, to generate a page identifier pageKey: HomeScreen and a page return identifier isback: true for the HomeScreen.

Step S207: Generate a page jump identifier based on page information of the previous page.

The page jump identifier is used to represent an identifier of a jump from the previous page to the current page, and the page displayed before the current page is uniquely represented by the page jump identifier. The page routing stack can determine the page jump identifier based on the page information of the previous page recorded by the page routing stack.

As shown in FIG. 11, when taking jumps between RN pages PageA→PageB→PageA as an example, when entering the PageB from the PageA, the page routing stack may record a switching state of the page, to generate a page jump identifier referPage: PageA for the PageB. When a return is made from the PageB to the PageA, the page routing stack may generate a page jump identifier referPage: PageA, for the PageA, based on the switching state of the page. When entering the PageA for the first time, the page jump identifier referPage for the PageA is empty.

As shown in FIG. 12, when taking jumps between SPA pages HomeScreen→DetailScreen→HomeScreen in the PageA page as an example, when entering the DetailScreen from the HomeScreen, the page routing stack may record a switching state of the page, to generate a page jump identifier referPage: DetailScreen for the DetailScreen. When a return is made from the DetailScreen to the HomeScreen, the page routing stack may record a switching state of the page, to generate a page jump identifier referPage: HomeScreen, for the HomeScreen. When entering the HomeScreen for the first time, the page jump identifier referPage for the Home-Screen is empty.

Step S208: Perform tracking on the current page according to the page identifier, the page return identifier, and the page jump identifier, to determine page tracking information.

Tracking of the current page is triggered based on the page identifier pageKey, the page return identifier isback, and the page jump identifier referPage corresponding to the current page, to generate page tracking information for the current page.

Specifically, when a jump occurs between SPA pages in the PageA page, page tracking information for each SPA page is generated based on the page identifier pageKey, the page return identifier isback, and the page jump identifier referPage corresponding to each SPA page, as shown in FIG. 12.

Figure 13:
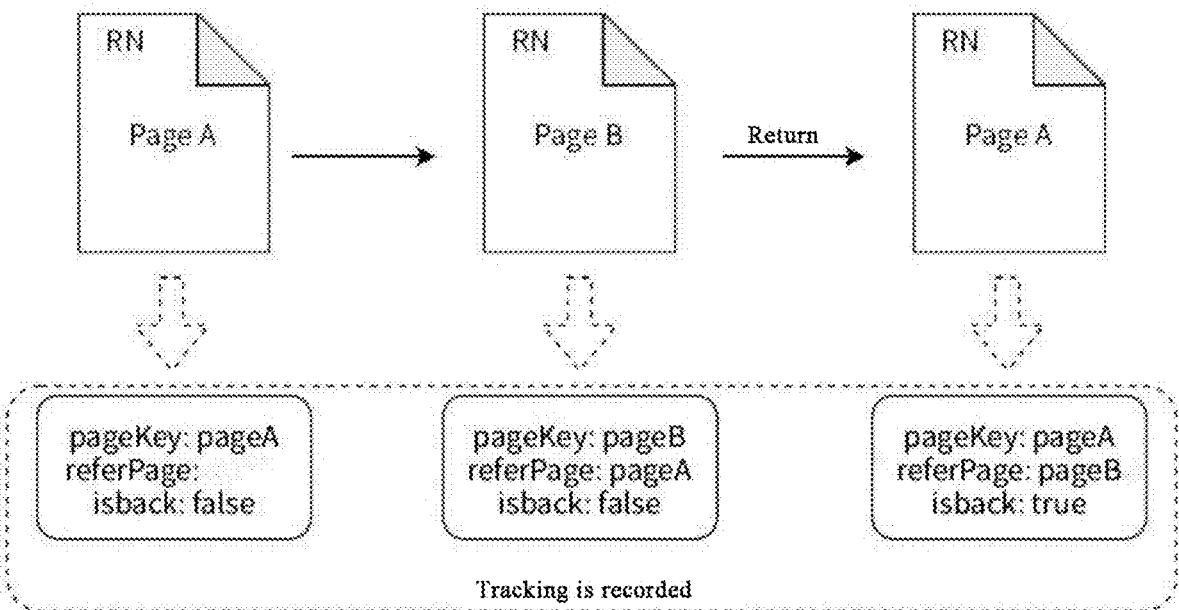
FIG. 13 is a schematic diagram of page tracking information generated by RN page jumps according to an embodiment of the present disclosure.

Specifically, when a jump occurs between RN pages, page tracking information for each RN page is generated based on the page identifier pageKey, the page return identifier isback, and the page jump identifier referPage corresponding to each RN page, as shown in FIG. 13.

Step S209: Determine page jump information corresponding to the current page based on the page tracking information. For details, refer to the related description of the corresponding step in the method embodiment described above, which is not described herein again.

According to the method for determining page jump information provided in this embodiment, when it is monitored that the page state changes, the current page and the previous page can be accurately determined based on the change of the page state, and the page type of the current page and the page type of the previous page are detected, to determine a corresponding page jump strategy based on the page type of the current page and the page type of the previous page. Then, a corresponding page jump identifier is determined based on different page jump strategies, and a page jump between different pages is represented by the page jump identifier, so that more accurate page tracking information can be generated, facilitating acquisition of accurate page jump information from the page tracking information. This method is not limited to the same page type. Therefore, when the page state changes, switching between different types of pages can be accurately collected to generate accurate page tracking information, thereby avoiding triggering of redundant tracking and ensuring accurate generation of the page tracking information, so that the page jump information can be accurately counted through the page tracking information.

In this embodiment, a method for determining page jump information is provided, which may be applied to a computer device, such as a mobile phone, a tablet computer, a computer, or the like. FIG. 14 is a flowchart of the method for determining page jump information according to an embodiment of the present disclosure. As shown in FIG. 14, the process includes the following steps.

Step S301: Monitor a page state of a page routing stack. For details, refer to the related description of the corresponding step in the method embodiment described above, which is not described herein again.

Step S302: When the page state changes, determine a current page and a previous page.

Step S303: Detect whether a page type of the current page is the same as a page type of the previous page. For details, refer to the related description of the corresponding step in the method embodiment described above, which is not described herein again.

Step S304: When the page type of the current page is different from the page type of the previous page, determine a first page type corresponding to the current page and a second page type corresponding to the previous page. For details, refer to the related description of the corresponding step in the method embodiment described above, which is not described herein again.

Step S305: Determine page tracking information for the current page based on the first page type and the second page type. For details, refer to the related description of the corresponding step in the method embodiment described above, which is not described herein again.

Step S306: Determine page jump information corresponding to the current page based on the page tracking information.

Specifically, step S306 may include the following steps.

Step S3061: Parse the page tracking information, to determine a target page jump identifier and a target page identifier carried in the page tracking information.

The target page jump identifier is used to represent jump information between pages, and a jump path between the pages is determined through the target page jump identifier. The target page identifier is a unique identifier of a page, and each accessed page is determined through the target page identifier.

As described above, the page tracking information is determined based on the page identifier, the page jump identifier, and the page return identifier. The target page jump identifier and the target page identifier corresponding to each page can be determined by parsing the page tracking information corresponding to each page.

Step S3062: Determine the page jump information of the current page based on the target page jump identifier and the target page identifier.

The page jump information is used to determine previous page information corresponding to the current page, and a jump path between pages can be specified through the page jump information. Specifically, a currently opened page can be determined based on the target page identifier, and a previous page that is opened before the current page can be determined based on the target page jump identifier. Therefore, the page jump information generated for the current page can be determined based on the target page jump identifier and the target page identifier.

According to the method for determining page jump information provided in this embodiment, the target page jump identifier and the target page identifier carried in the page tracking information are parsed, to determine the page jump information generated for the current page. In this way, a browsing path of the page can be tracked through the page jump identifier in the page tracking information, thereby implementing accurate statistics of the page jump information.

An embodiment of the present disclosure further provides an apparatus for determining page jump information. The apparatus is configured to implement the foregoing embodiments and preferred implementations, and details that have been described are not described again. As used below, the term "module" may be a combination of software and/or hardware that implements a predetermined function. Although the apparatus described in the following embodiments is preferably implemented by software, an implementation of hardware, or a combination of software and hardware is also possible and contemplated.

Figure 15:
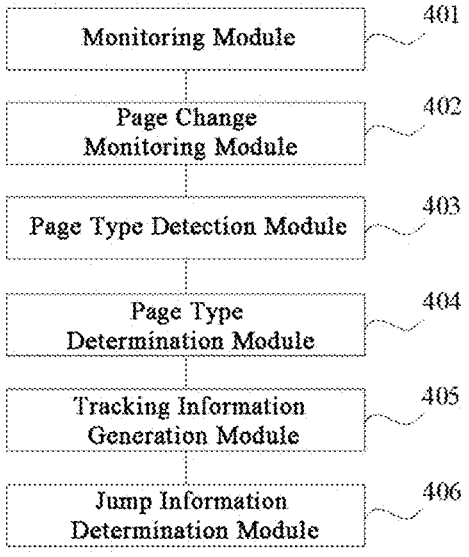
FIG. 15 is a block diagram of a structure of an apparatus for determining page jump information according to an embodiment of the present disclosure.

This embodiment provides an apparatus for determining page jump information. As shown in FIG. 15, the apparatus includes: a monitoring module 401 configured to monitor a page state of a page routing stack, wherein the page routing stack is a stack data structure of an application used for managing page routing information; a page change monitoring module 402 configured to determine a current page and a previous page when the page state changes; a page type detection module 403 configured to detect whether a page type of the current page is the same as a page type of the previous page; a page type determination module 404 configured to determine a first page type corresponding to the current page and a second page type corresponding to the previous page when the page type of the current page is different from the page type of the previous page; a tracking information generation module 405 configured to determine page tracking information for the current page based on the first page type and the second page type; and a jump information determination module 406 configured to determine page jump information corresponding to the current page based on the page tracking information.

In some optional implementations, the foregoing apparatus may further include: an identifier generation module configured to generate a page identifier and a page return identifier based on page information of the current page when the page type of the current page is the same as the page type of the previous page; a jump identifier generation module configured to generate a page jump identifier based on page information of the previous page; and a tracking information determination module configured to perform tracking on the current page according to the page identifier, the page return identifier, and the page jump identifier to determine page tracking information.

In some optional implementations, when the current page is an application page and the previous page is another page, the tracking information generation module 405 may include: a first page obtaining unit configured to obtain a first native interactive page to which the application page belongs; a first identifier generation unit configured to generate a first page identifier and a first page jump identifier for the first native interactive page based on page information of the first native interactive page and page information of the other page; a second identifier generation unit configured to generate a second page identifier, a second page jump identifier, and a first page return identifier for the application page based on page information of the application page and page information of the first native interactive page; a third identifier generation unit configured to merge the first page jump identifier and the second page jump identifier, determine the first page jump identifier as a first target jump identifier of the application page, and determine the second page identifier as a first target page identifier of the application page; and a first tracking unit configured to perform tracking on the application page according to the first target jump identifier, the first target page return identifier, and the first target page identifier to generate page tracking information of the application page.

In some optional implementations, when the previous page is an application page and the current page is another page, the tracking information generation module 405 may include: a second page obtaining unit configured to obtain a second native interactive page to which the application page belongs; a fourth identifier generation unit configured to generate a third page identifier, a third page jump identifier, and a second target page return identifier for the other page based on page information of the other page and page information of the second native interactive page; a fifth identifier generation unit configured to generate a fourth page identifier and a fourth page jump identifier for the application page based on page information of the application page and page information of the second native interactive page; a sixth identifier generation unit configured to merge the third page jump identifier and the fourth page jump identifier, determine the fourth page identifier as a second target jump identifier of the other page, and determine the third page identifier as a second target page identifier of the other page; and a second tracking unit configured to perform tracking on the other page according to the second target jump identifier, the second target page return identifier, and the second target page identifier to generate page tracking information of the other page.

In some optional implementations, when the current page is a native page and the previous page is a native interactive page, the tracking information generation module 405 may include: a tracking information determination unit configured to determine page tracking information corresponding to the native interactive page based on page information of the native interactive page; and a tracking information generation control unit configured to stop generating page tracking information for the current page when entering the native page from the native interactive page.

In some optional implementations, when the current page is a native interactive page and the previous page is a native page, the tracking information generation module 405 may include: a seventh identifier generation unit configured to generate a current page identifier and a current page return identifier based on page information of the native interactive page; an eighth identifier generation unit configured to generate a current page jump identifier based on page information of the native page; and a third tracking unit configured to perform tracking on the native interactive page according to the current page identifier, the current page return identifier, and the current page jump identifier to generate page tracking information of the native interactive page.

In some optional implementations, the jump information determination module 403 may include: an information parsing unit configured to parse the page tracking information, to determine a target page jump identifier and a target page identifier carried in the page tracking information; and a jump information generation unit configured to determine the page jump information of the current page based on the target page jump identifier and the target page identifier.

Further function descriptions of the foregoing modules and units are the same as those of the corresponding embodiments. Details are not described herein again.

The apparatus for determining page jump information in this embodiment is presented in the form of a functional unit. The unit herein refers to an ASIC circuit, a processor that executes one or more software or firmware programs, and a memory, and/or another device that may provide the foregoing functions.

According to the apparatus for determining page jump information provided in this embodiment, when it is monitored that the page state changes, the current page and the previous page can be accurately determined based on the change of the page state, and the page type of the current page and the page type of the previous page can be detected, to generate the page tracking information based on different page types. The apparatus is not limited to the same page type. Therefore, when the page state changes, switching between different types of pages can be accurately collected to generate accurate page tracking information, thereby avoiding triggering of redundant tracking and ensuring accurate generation of the page tracking information, so that the page jump information can be accurately counted through the page tracking information.

An embodiment of the present disclosure further provides a computer device, including the apparatus for determining page jump information shown in FIG. 15.

Figure 16:
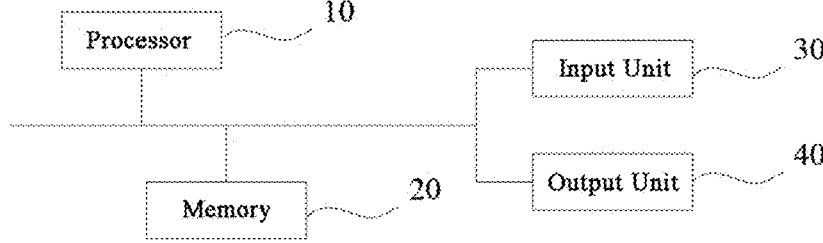
FIG. 16 is a schematic diagram of a hardware structure of a computer device according to an embodiment of the present disclosure.

Referring to FIG. 16, FIG. 16 is a schematic diagram of a structure of a computer device according to an optional embodiment of the present disclosure. As shown in FIG. 16, the computer device includes one or more processors 10, a memory 20, and an interface for connecting various components, including a high-speed interface and a low-speed interface. The various components are in communication connection with each other by using different buses, and may be mounted on a common mainboard or mounted in another manner as required. The processor may process instructions executed in the computer device, including instructions stored in or on the memory and displayed on an external input/output apparatus (for example, a display apparatus coupled to the interface) to display graphical information of a GUI. In some optional implementations, if necessary, a plurality of processors and/or a plurality of buses may be used together with a plurality of memories and a plurality of memories. Similarly, a plurality of computer devices may be connected, and each device provides some necessary operations (for example, as a server array, a group of blade servers, or a multi-processor system). FIG. 16 shows one processor 10 as an example.

The processor 10 may be a central processing unit, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable gate array, a general array logic, or any combination thereof.

The memory 20 stores instructions executable by at least one processor 10, so that the at least one processor 10 executes the method shown in the foregoing embodiment.

The memory 20 may include a program storage area and a data storage area. The program storage area may store an operating system and an application required by at least one function. The data storage area may store data created according to the use of the computer device of the landing page of an APP, and the like. In addition, the memory 20 may include a high-speed random access memory, and may further include a non-transitory memory, for example, at least one magnetic disk storage device, a flash memory device, or another non-transitory solid-state storage device. In some optional implementations, the memory 20 may alternatively include a memory remotely arranged relative to the processor 10. The remote memory may be connected to the computer device through a network. Examples of the network include, but are not limited to, the Internet, an intranet, a local area network, a mobile communication network, and a combination thereof.

The memory 20 may include a volatile memory, for example, a random access memory; or the memory may include a non-volatile memory, for example, a flash memory, a hard disk, or a solid-state hard disk; or the memory 20 may further include a combination of the foregoing types of memories.

The computer device further includes an input unit 30 and an output unit 40. The processor 10, the memory 20, the input unit 30, and the output unit 40 may be connected through a bus or in another manner. FIG. 16 shows an example of connection through the bus.

The input unit 30 may receive inputted numeric or character information and generate a key signal input related to user settings and function control of the computer device, for example, a touchscreen, a keypad, a mouse, a trackpad, a touchpad, a pointing stick, one or more mouse buttons, a trackball, a joystick, or the like. The output unit 40 may include a display device, an auxiliary lighting apparatus (for example, an LED), a haptic feedback apparatus (for example, a vibration motor), and the like. The display device includes but is not limited to a liquid crystal display, a light-emitting diode, a display, and a plasma display. In some optional implementations, the display device may be a touchscreen.

The computer device further includes a communication interface, configured to perform communication between the computer device and another device or a communication network.

An embodiment of the present disclosure further provides a computer-readable storage medium. The method according to the embodiment of the present disclosure may be implemented in hardware or firmware, or implemented as computer code that can be recorded in a storage medium or originally stored in a remote storage medium or a non-transitory machine-readable storage medium through a network and stored in a local storage medium, so that the method described herein may be stored in such software processing on a storage medium using a general-purpose computer, a special-purpose processor, or programmable or special-purpose hardware. The storage medium may be a magnetic disk, an optical disc, a read-only memory, a random access memory, a flash memory, a hard disk, or solid-state hard disk, or the like. Further, the storage medium may further include a combination of the foregoing types of memories. It can be understood that a computer, a processor, a microprocessor controller, or programmable hardware includes a storage component that can store or receive software or computer code, and when the software or computer code is accessed and executed by the computer, the processor, or the hardware, the method shown in the foregoing embodiment is implemented.

Although the embodiments of the present disclosure are described with reference to the accompanying drawings, persons of ordinary skill in the art may make various modifications and variations without departing from the spirit and scope of the present disclosure. Such modifications and variations all fall within the scope defined by the appended claims.

I claim:

1. A method for determining page jump information, comprising:

monitoring a page state of a page routing stack, wherein the page routing stack is a stack data structure of an application used for managing page routing information;

detecting a change in the page state;

in response to detecting the change in the page state, determining a current page and a previous page;

detecting whether a page type of the current page is the same as a page type of the previous page;

determining that the page type of the current page is different from the page type of the previous page;

in response to the page type of the current page being different from the page type of the previous page, determining a first page type corresponding to the current page and a second page type corresponding to the previous page;

determining page tracking information for the current page based on the first page type and the second page type;

determining page jump information corresponding to the current page based on the page tracking information; and determining that the current page is an application page and the previous page is another page, wherein in response to the current page being the application page and the previous page being the another page, the determining the page tracking information for the current page based on the first page type and the second page type comprises:

obtaining a first native interactive page to which the application page belongs;

generating a first page identifier and a first page jump identifier for the first native interactive page, based on page information of the first native interactive page and page information of the another page;

generating a second page identifier, a second page jump identifier, and a first page return identifier for the application page, based on page information of the application page and the page information of the first native interactive page;

merging the first page jump identifier and the second page jump identifier, determining the first page jump identifier as a first target jump identifier of the application page, and determining the second page identifier as a first target page identifier of the application page; and performing tracking on the application page according to the first target jump identifier, a first target page return identifier, and the first target page identifier, to generate page tracking information of the application page.

2. The method according to claim 1, further comprising:

in response to the page type of the current page being the same as the page type of the previous page, generating a page identifier and a page return identifier based on page information of the current page;

generating a page jump identifier based on page information of the previous page; and performing tracking on the current page according to the page identifier, the page return identifier, and the page jump identifier, to determine the page tracking information for the current page.

3. The method according to claim 1, wherein in response to the previous page being a second application page and the current page being a second another page, the determining the page tracking information for the current page based on the first page type and the second page type comprises:

obtaining a second native interactive page to which the second application page belongs;

generating a third page identifier, a third page jump identifier, and a second target page return identifier for the second another page, based on page information of the second another page and page information of the second native interactive page;

generating a fourth page identifier and a fourth page jump identifier for the second application page, based on page information of the second application page and the page information of the second native interactive page;

merging the third page jump identifier and the fourth page jump identifier, determining the fourth page identifier as a second target jump identifier of the second another page, and determining the third page identifier as a second target page identifier of the second another page; and performing tracking on the second another page according to the second target jump identifier, the second target page return identifier, and the second target page identifier, to generate page tracking information of the second another page.

4. The method according to claim 1, wherein in response to the current page being a native page and the previous page being a native interactive page, the determining the page tracking information for the current page based on the first page type and the second page type comprises:

determining native page tracking information corresponding to the native interactive page based on page information of the native interactive page; and in response to entering the native page from the native interactive page, stopping generating the page tracking information for the current page.

5. The method according to claim 1, wherein in response to the current page being a native interactive page and the previous page being a native page, the determining the page tracking information for the current page based on the first page type and the second page type comprises:

generating a current page identifier and a current page return identifier based on page information of the native interactive page;

generating a current page jump identifier based on page information of the native page; and performing tracking on the native interactive page according to the current page identifier, the current page return identifier, and the current page jump identifier, to generate a native page tracking information corresponding to the native interactive page.

6. The method according to claim 1, wherein the determining the page jump information corresponding to the current page based on the page tracking information for the current page comprises:

parsing the page tracking information for the current page to determine a target page jump identifier and a target page identifier carried in the page tracking information for the current page; and determining the page jump information corresponding to the current page based on the target page jump identifier and the target page identifier.

7. A computer device, comprising:

a memory and a processor, wherein the memory and the processor are in communication connection with each other, computer instructions are stored in the memory, and the processor executes the computer instructions to:

monitor a page state of a page routing stack, wherein the page routing stack is a stack data structure of an application used for managing page routing information;

in response to detecting a change in the page state, determine a current page and a previous page;

detect whether a page type of the current page is the same as a page type of the previous page;

in response to the page type of the current page being different from the page type of the previous page, determine a first page type corresponding to the current page and a second page type corresponding to the previous page;

determine page tracking information for the current page based on the first page type and the second page type; and determine page jump information corresponding to the current page based on the page tracking information, wherein in response to the current page being an application page and the previous page being another page, the computer instructions executed by the processor to determine the page tracking information for the current page based on the first page type and the second page type further cause the processor to:

obtain a first native interactive page to which the application page belongs;

generate a first page identifier and a first page jump identifier for the first native interactive page, based on page information of the first native interactive page and page information of the another page;

generate a second page identifier, a second page jump identifier, and a first page return identifier for the application page, based on page information of the application page and the page information of the first native interactive page;

merge the first page jump identifier and the second page jump identifier, determine the first page jump identifier as a first target jump identifier of the application page, and determine the second page identifier as a first target page identifier of the application page; and perform tracking on the application page according to the first target jump identifier, a first target page return identifier, and the first target page identifier, to generate page tracking information of the application page.

8. The computer device according to claim 7, wherein the processor further executes the computer instructions to:

in response to the page type of the current page being the same as the page type of the previous page, generate a page identifier and a page return identifier based on page information of the current page;

generate a page jump identifier based on page information of the previous page; and perform tracking on the current page according to the page identifier, the page return identifier, and the page jump identifier, to determine the page tracking information for the current page.

9. The computer device according to claim 7, wherein in response to the previous page being a second application page and the current page being a second another page, the computer instructions executed by the processor to determine the page tracking information for the current page based on the first page type and the second page type further cause the processor to:

obtain a second native interactive page to which the second application page belongs;

generate a third page identifier, a third page jump identifier, and a second target page return identifier for the second another page, based on page information of the second another page and page information of the second native interactive page;

generate a fourth page identifier and a fourth page jump identifier for the second application page, based on page information of the second application page and the page information of the second native interactive page;

merge the third page jump identifier and the fourth page jump identifier, determine the fourth page identifier as a second target jump identifier of the second another page, and determine the third page identifier as a second target page identifier of the second another page; and perform tracking on the second another page according to the second target jump identifier, the second target page return identifier, and the second target page identifier, to generate page tracking information of the second another page.

10. The computer device according to claim 7, wherein in response to the current page being a native page and the previous page being a native interactive page, the computer instructions executed by the processor to determine the page tracking information for the current page based on the first page type and the second page type further cause the processor to:

determine native page tracking information corresponding to the native interactive page based on page information of the native interactive page; and in response to entering the native page from the native interactive page, stop generating the page tracking information for the current page.

11. The computer device according to claim 10, wherein in response to the current page being the native interactive page and the previous page being the native page, the computer instructions executed by the processor to determine the page tracking information for the current page based on the first page type and the second page type further cause the processor to:

generate a current page identifier and a current page return identifier based on page information of the native interactive page;

generate a current page jump identifier based on page information of the native page; and perform tracking on the native interactive page according to the current page identifier, the current page return identifier, and the current page jump identifier, to generate the native page tracking information corresponding to the native interactive page.

12. The computer device according to claim 7, wherein the computer instructions executed by the processor to determine the page jump information corresponding to the current page based on the page tracking information for the current page further cause the processor to:

parse the page tracking information for the current page to determine a target page jump identifier and a target page identifier carried in the page tracking information for the current page; and determine the page jump information corresponding to the current page based on the target page jump identifier and the target page identifier.

13. A non-transitory computer-readable storage medium having stored thereon computer instructions that are configured to cause a computer to:

monitor a page state of a page routing stack, wherein the page routing stack is a stack data structure of an application used for managing page routing information;

in response to detecting a change in the page state, determine a current page and a previous page;

detect whether a page type of the current page is the same as a page type of the previous page;

in response to the page type of the current page being different from the page type of the previous page, determine a first page type corresponding to the current page and a second page type corresponding to the previous page;

determine page tracking information for the current page based on the first page type and the second page type; and determine page jump information corresponding to the current page based on the page tracking information, wherein in response to the current page being an application page and the previous page being another page, the computer instructions being configured to cause the computer to determine the page tracking information for the current page based on the first page type and the second page type further cause the computer to:

obtain a first native interactive page to which the application page belongs;

generate a first page identifier and a first page jump identifier for the first native interactive page, based on page information of the first native interactive page and page information of the another page;

generate a second page identifier, a second page jump identifier, and a first page return identifier for the application page, based on page information of the application page and the page information of the first native interactive page;

merge the first page jump identifier and the second page jump identifier, determine the first page jump identifier as a first target jump identifier of the application page, and determine the second page identifier as a first target page identifier of the application page; and perform tracking on the application page according to the first target jump identifier, a first target page return identifier, and the first target page identifier, to generate page tracking information of the application page.

14. The non-transitory computer-readable storage medium according to claim 13, wherein the computer instructions are further configured to cause the computer to:

in response to the page type of the current page being the same as the page type of the previous page, generate a page identifier and a page return identifier based on page information of the current page;

generate a page jump identifier based on page information of the previous page; and perform tracking on the current page according to the page identifier, the page return identifier, and the page jump identifier, to determine the page tracking information for the current page.

15. The non-transitory computer-readable storage medium according to claim 13, wherein in response to the previous page being a second application page and the current page being a second another page, the computer instructions being configured to cause the computer to determine the page tracking information for the current page based on the first page type and the second page type further cause the computer to:

obtain a second native interactive page to which the second application page belongs;

generate a third page identifier, a third page jump identifier, and a second target page return identifier for the second another page, based on page information of the second another page and page information of the second native interactive page;

generate a fourth page identifier and a fourth page jump identifier for the second application page, based on page information of the second application page and the page information of the second native interactive page;

merge the third page jump identifier and the fourth page jump identifier, determine the fourth page identifier as a second target jump identifier of the second another page, and determine the third page identifier as a second target page identifier of the second another page; and perform tracking on the second another page according to the second target jump identifier, the second target page return identifier, and the second target page identifier, to generate page tracking information of the second another page.

16. The non-transitory computer-readable storage medium according to claim 13, wherein in response to the current page being a native page and the previous page being a native interactive page, the computer instructions being configured to cause the computer to determine the page tracking information for the current page based on the first page type and the second page type further cause the computer to:

determine native page tracking information corresponding to the native interactive page based on page information of the native interactive page; and in response to entering the native page from the native interactive page, stop generating the page tracking information for the current page.

17. The non-transitory computer-readable storage medium according to claim 16, wherein in response to the current page being the native interactive page and the previous page being the native page, the computer instructions being configured to cause the computer to determine the page tracking information for the current page based on the first page type and the second page type further cause the computer to:

generate a current page identifier and a current page return identifier based on page information of the native interactive page;

generate a current page jump identifier based on page information of the native page; and perform tracking on the native interactive page according to the current page identifier, the current page return identifier, and the current page jump identifier, to generate the native page tracking information corresponding to the native interactive page.

* * * * *